Patented May 21, 1946

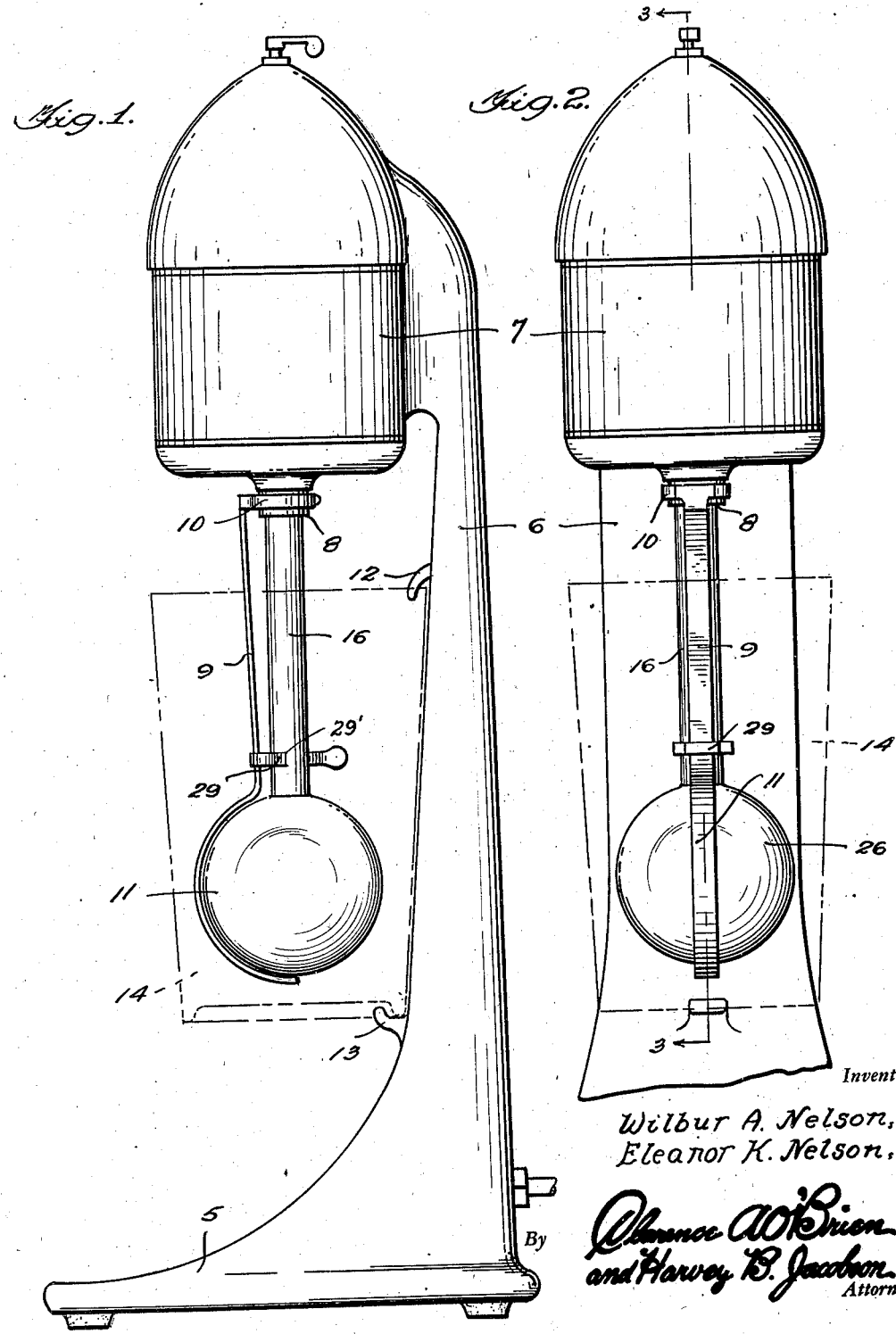

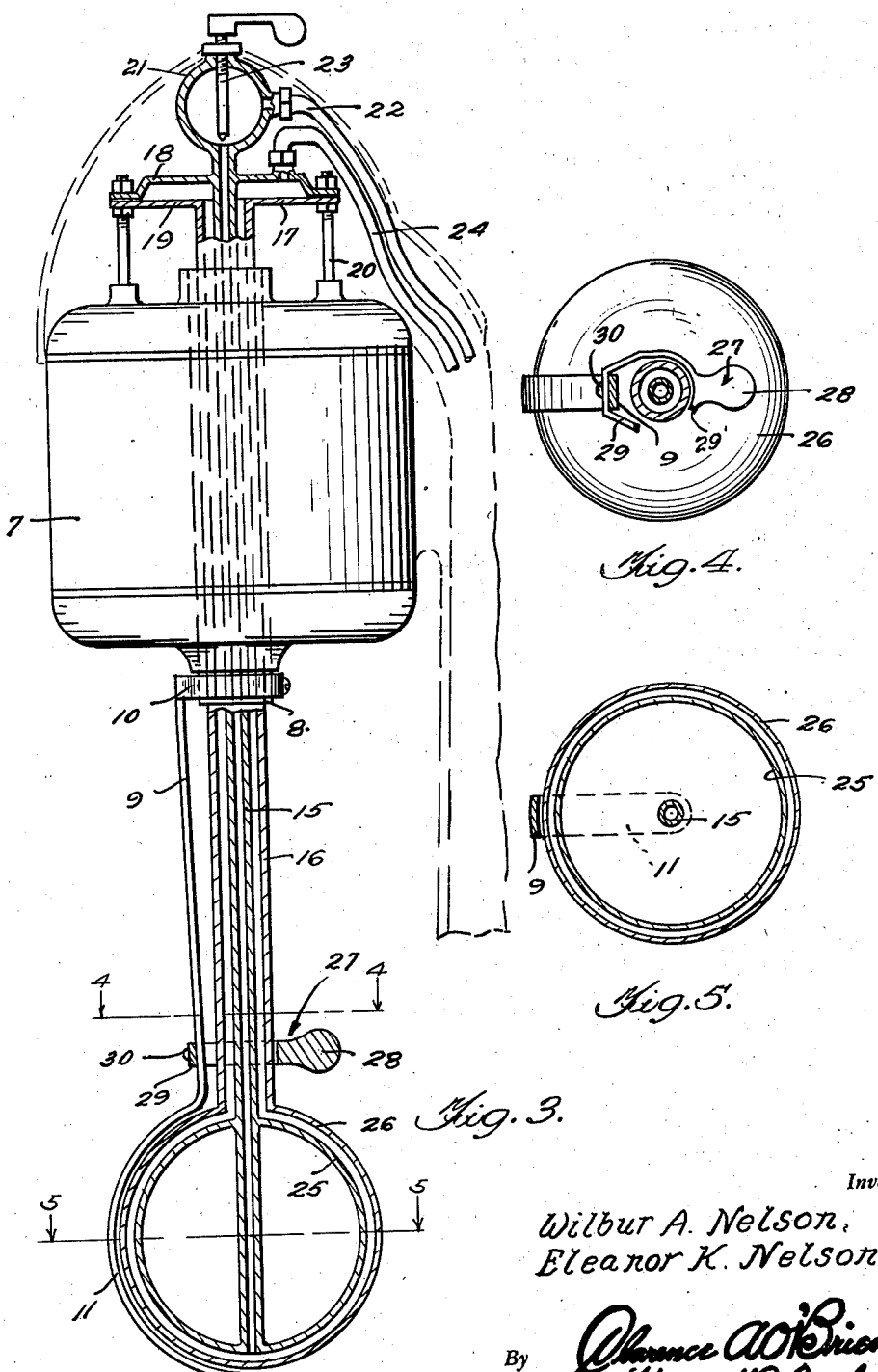

2,400,773

UNITED STATES PATENT OFFICE 2,400,773

BEVERAGE MIXER AND COOLER

Wilbur A. Nelson and Eleanor K. Nelson, Los Angeles, Calif.

Application April 11, 1945, Serial No. 587,678

3 Claims. (Cl. 257—120)

The present invention has reference to a device for use in the cooling and mixing of certain beverages as milk shakes and the like and which are generally served in a cool state to the purchasing public, the invention embodying a combined motor driven mixing and cooling device such as covered in our prior U. S. Letters Patent No. 2,319,429.

An important object of the present invention is to provide a stationary hollow expansion chamber adapted for immersion in the liquid to be cooled together with an agitator adapted to travel around said expansion chamber.

A further object of the invention is to provide a combined scraper and agitator adapted to travel around the expansion chamber of circular or bulbous construction together with centrifugal responsive means for maintaining the scraper in contact with the expansion chamber during rotation of the agitator and scraper.

A still further object of the invention is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a front elevational view.

Figure 3 is an enlarged vertical sectional view taken substantially on a line 3—3 of Figure 2, and Figures 4 and 5 are transverse sectional views taken respectively on the lines 4—4 and 5—5 of Figure 3.

Referring more in detail to the drawings it will be seen that in the preferred embodiment thereof the invention comprises a stand of suitable shape and design and characterized by a base 5 from which rises a hollow post 6 on the upper end of which is suitably mounted and secured an electric motor 7.

The motor 7 includes a tubular armature shaft 8 which extends below the casing of the motor and to which is secured a resilient agitator arm 9 by means of a clamping collar 10. The lower end of the arm 9 is curved longitudinally as indicated at 11 for a purpose to be more fully hereinafter described.

The post 6 is also provided with vertically spaced receptacle engaging elements 12 and 13 for engaging and retaining in position a receptacle 14 on the post. The receptacle 14 is adapted to contain liquid and other ingredients of a drink to be mixed, such as a milk shake or the like, preparatory to serving thereof as a beverage.

Freely inserted through the shaft 8 of the motor are inner and outer tubes 15 and 16, respectively, the upper end of the outer tube being formed with a flange 17 and the inner tube being formed with a flange 18 spaced above the flange 17 to form a chamber 19 therebetween, the edges of the flanges being secured to the top of the motor housing by bolts 20.

A valve housing 21 is formed at the upper end of the inner tube 15 having a refrigerant supply pipe 22 attached thereto and also having a needle valve 23 adjustably mounted therein for controlling the feeding of refrigerant into the tube 15.

A return tube 24 is attached to the flange 18 for the chamber 19 and by means of which the refrigerant is returned to a compressor (not shown).

The lower end of the inner tube 15 extends downwardly through a hollow ball 25 having its walls spaced inwardly from a similar hollow ball 26 formed on the lower end of the outer tube 16. The space between the walls of the balls 25 and 26 forms an expansion chamber for the refrigerant as the same passes downwardly through the tube 15 and into the ball 26 where it is returned upwardly through the tube 16 and return pipe 24.

The vertically curved scraper and agitator 11 is normally spaced slightly outwardly from the surface of the ball 26 and a centrifugally responsive member 27 including a horizontally extending weighted portion 28 and a split ring portion 29 surrounds the tubes 15 and 16 adjacent their lower portion and is attached to the lower portion of the resilient arm 9 by means of a screw or the like 30, the weighted end portion 28 of the member 27 projecting outwardly at a side of the tube 16 opposite from the resilient arm 9. The ring portion 29 is split to provide a gap 29' therein through which the agitator arm 9 may be inserted into said portion 29 when replacing said agitator.

Accordingly, in the operation of the device as the shaft 8 of the motor is rotated the arm 9 and combined scraper and agitator 11 will likewise be rotated while the balls 25 and 26 remain stationary and the weighted end 28 of the member 27 will move outwardly by centrifugal action whereby to draw the scraper and agitator 11 inwardly toward the surface of the ball 26 into scraping contact therewith.

The expansion of the refrigerant in the ball 26 will serve to cool the same and thus cool the contents of the receptacle 14.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though we have herein shown and described a preferred embodiment of our invention the same is susceptible to certain changes fully comprehended by the spirit of the invention as herein described and the scope of the appended claims.

Having thus described the invention, what we claim is:

1. A beverage mixer of the class described and including a stationary cooling chamber, a combined motor driven agitator and scraper mounted for movement around the chamber, and speed responsive means carried by the combined agitator and scraper for moving the latter into and out of contact with the chamber.

2. A beverage mixer of the class described comprising a bulbous cooling chamber including inner and outer spaced walls, means for circulating a cooling agent in the chamber, a combined motor driven agitator and scraper and including a resilient arm and a curved blade extending partly around the chamber and movable around the latter, and centrifugal responsive means carried by the arm for moving the blade toward and away from the chamber.

3. A beverage mixer of the class described comprising a bulbous cooling chamber including inner and outer spaced walls, means for circulating a cooling agent in the chamber, a combined motor driven agitator and scraper and including a resilient arm and a curved blade extending partly around the chamber and movable around the latter, and a weighted member projecting laterally from the arm and responsive to centrifugal action to move the blade toward and away from the chamber.

WILBUR A. NELSON.
ELEANOR K. NELSON.